United States Patent
Tian et al.

(10) Patent No.: US 11,687,711 B2
(45) Date of Patent: Jun. 27, 2023

(54) METHOD AND APPARATUS FOR GENERATING COMMENTARY

(71) Applicants: Baidu.com Times Technology (Beijing) Co., Ltd., Beijing (CN); Baidu USA LLC, Sunnyvale, CA (US)

(72) Inventors: Hao Tian, Sunnyvale, CA (US); Xi Chen, Sunnyvale, CA (US); Jeff ChienYu Wang, Sunnyvale, CA (US); Daming Lu, Sunnyvale, CA (US)

(73) Assignee: BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 309 days.

(21) Appl. No.: 16/703,718

(22) Filed: Dec. 4, 2019

(65) Prior Publication Data
US 2020/0320253 A1    Oct. 8, 2020

(30) Foreign Application Priority Data
Apr. 8, 2019    (CN) .......................... 201910277162.2

(51) Int. Cl.
*G06F 40/216* (2020.01)
*G06F 40/30* (2020.01)
(Continued)

(52) U.S. Cl.
CPC ............ *G06F 40/216* (2020.01); *G06F 40/30* (2020.01); *G06V 10/763* (2022.01);
(Continued)

(58) Field of Classification Search
CPC .. G06F 40/30; G06K 9/00731; G06K 9/6221; G10L 13/00
See application file for complete search history.

(56) References Cited

U.S. PATENT DOCUMENTS

| 7,890,331 B2* | 2/2011 | Barbieri ................. G11B 27/11 |
| | | 704/270 |
| 2009/0019013 A1* | 1/2009 | Tareen .................. G06F 16/219 |

(Continued)

FOREIGN PATENT DOCUMENTS

| CN | 108595388 A | 9/2018 |
| JP | 5-232982 A | 9/1993 |

(Continued)

OTHER PUBLICATIONS

Japanese Office Action for Japanese Application No. 2019-218379, dated Oct. 20, 2021, 5 pages.
(Continued)

*Primary Examiner* — Pierre Louis Desir
*Assistant Examiner* — Nicole A K Schmieder
(74) *Attorney, Agent, or Firm* — Seed IP Law Group LLP

(57) ABSTRACT

Embodiments of the present disclosure provide a method and apparatus for generating a commentary. The method may include: acquiring at least one news cluster composed of pieces of news generated within a first preset time length, the pieces of news in the news cluster direct to a given news event; determining a target news cluster based on the at least one news cluster; determining, for each piece of news in the target news cluster, a score of being suitable for generating a commentary for the piece of news; and generating, based on a piece of target news, a commentary for the target news cluster, where the piece of target news is a piece of news having a highest score of being suitable for generating a commentary in the target news cluster.

15 Claims, 6 Drawing Sheets

(51) Int. Cl.
*G10L 13/00* (2006.01)
*G06V 20/40* (2022.01)
*G06V 10/762* (2022.01)
*G06V 10/764* (2022.01)
*G06V 10/82* (2022.01)
*G06F 18/2321* (2023.01)

(52) U.S. Cl.
CPC ............ *G06V 10/764* (2022.01); *G06V 10/82* (2022.01); *G06V 20/43* (2022.01); *G10L 13/00* (2013.01); *G06F 18/2321* (2023.01)

(56) References Cited

U.S. PATENT DOCUMENTS

| | | | |
|---|---|---|---|
| 2012/0259856 | A1 | 10/2012 | Gehrking et al. |
| 2015/0332666 | A1* | 11/2015 | Dayan .................. G11B 27/031 386/285 |
| 2016/0300110 | A1* | 10/2016 | Prosek ................. G06V 10/762 |
| 2017/0011009 | A1 | 1/2017 | Choi et al. |
| 2018/0143980 | A1* | 5/2018 | Tanikella .......... G06F 16/24578 |
| 2019/0129942 | A1* | 5/2019 | Seuss ...................... G06F 40/56 |

FOREIGN PATENT DOCUMENTS

| | | |
|---|---|---|
| JP | 8-221243 A | 8/1996 |
| JP | 2000-259666 A | 9/2000 |
| JP | 2000-339250 A | 12/2000 |
| JP | 2006-338086 A | 12/2006 |
| JP | 2008-9729 A | 1/2008 |
| JP | 2008-164759 A | 7/2008 |
| JP | 2017-102652 A | 6/2017 |
| JP | 2017-201437 A | 11/2017 |
| JP | 2019-46017 A | 3/2019 |
| JP | 2019-204507 A | 11/2019 |
| WO | 2018/0432112 | 3/2018 |

OTHER PUBLICATIONS

Takatsu et al., "A Spoken Dialogue System for Enabling Comfortable Information Acquisition and Consumption," Proceedings of the Twenty-second Annual Meeting of the Association for Natural Language Processing, Mar. 8-10, 2016, 10 pages.

* cited by examiner

METHOD AND APPARATUS FOR GENERATING COMMENTARY

CROSS-REFERENCE TO RELATED APPLICATIONS

This application claims priority to Chinese Patent Application No. 201910277162.2, filed with the China National Intellectual Property Administration (CNIPA) on Apr. 8, 2019, the content of which is incorporated herein by reference in its entirety.

TECHNICAL FIELD

Embodiments of the present disclosure relate to the field of computer technology, and specifically to a method and apparatus for generating a commentary.

BACKGROUND

With the development of network technology, various types of news from all over the world can be released to users through various media. For a given news event, various media (such as news websites or news applications) may edit different news, and the focuses of the news released by different media may be different from each other, and the news that reports the given news event also has more or less coincident information.

A user may read a plurality news reports in order to extract desired information, which results in low efficiency of gaining news. In order to help the user to improve the efficiency of gaining news, the plurality of news of the given news event are aggregated, redundant information in the plurality news is removed, and commentary for the news event is extracted.

SUMMARY

Embodiments of the present disclosure provide a method and apparatus for generation a commentary.

According to a first aspect, some embodiments of the present disclosure provide a method for generating information, the method including: acquiring at least one news cluster composed of pieces of news generated within a first preset time length, the pieces of news in the news cluster direct to a given news event; determining a target news cluster based on the at least one news cluster; for each piece of news in the target news cluster, determining for the piece of news a score of being suitable for generating a commentary; and generating, based on apiece of target news, a commentary for the target news cluster, wherein the piece of target news is a piece of news having a highest score of being suitable for generating a commentary in the target news cluster.

In some embodiments, the method further includes: generating a speech and/or a video corresponding to the commentary.

In some embodiments, the method further incudes: sending the speech and/or video corresponding to the commentary to a terminal device, so that the terminal device presents the received speech and/or video.

In some embodiments, the determining a target news cluster based on the at least one news cluster includes: determining each of the at least one news cluster as the target news cluster.

In some embodiments, the determining a target news cluster based on the at least one news cluster includes: sorting respective news clusters in the at least one news cluster in descending order according to the number of news generated within a recent second preset time length in the news clusters; and determining each news cluster sorted within a preset sorting range in the at least one news cluster as the target news cluster.

In some embodiments, the determining a target news cluster based on the at least one news cluster includes: determining each high-quality news cluster in the at least one news cluster as the target news cluster, wherein a number of images comprised in the news of the high-quality news cluster is greater than a preset minimum number of images and a number of videos comprised is greater than a preset minimum number of videos.

In some embodiments, the determining a target news cluster based on the at least one news cluster includes: for each of the at least one news cluster, determining a news event topic corresponding to the news cluster and a current frequency of occurrence of the determined news event topic based on the pieces of news in the news cluster; determining frequency differences between current frequencies of occurrence of the news event topics corresponding to the at least one news cluster and historical frequency of occurrences of the news event topics; and determining, in the at least one news cluster, a news cluster with a frequency difference of a corresponding news event topic being greater than a preset frequency difference threshold as the target news cluster.

In some embodiments, the generating, based on a piece of target news, a commentary of the target news cluster includes: determining the text comprised in the target news as a target text; deleting a text unsuitable for a commentary from the target text, wherein the text unsuitable for a commentary is a text in a predetermined set of texts unsuitable for a commentary; replacing the written language comprised in the target text with a spoken language of an identical semantics; and determining a digest text obtained by extracting a digest from the target text as the commentary of the target news cluster.

In some embodiments, the determining a digest text obtained by extracting a digest from the target text as the commentary of the target news cluster includes: determining a maximum number of characters for the commentary according to a preset highest speech rate and a preset longest audio duration; extracting a digest from the target text, the extracted digest text having fewer characters than the maximum number of characters of the commentary; and determining the extracted digest text as the commentary of the target news cluster.

In some embodiments, the for each piece of news in the target news cluster, determining for the piece of news a score of being suitable for generating a commentary includes: extracting a feature value of the piece of news under at least one feature; and determining, based on the extracted at least one feature value, a score of being suitable for generating a commentary for the piece of news.

In some embodiments, the determining, for each piece of news in the target news cluster, a score of being suitable for generating a commentary for the piece of news includes: inputting the text comprised in the piece of news into a pre-trained score calculation model to obtain a score of being suitable for generating a commentary for the piece of news, wherein the score calculation model is used to characterize a corresponding relationship between a text and a score of being suitable for generating a commentary for the text.

According to a second aspect, some embodiments of the present disclosure provide an apparatus for generating a commentary, the apparatus including: an acquiring unit, configured to acquire at least one news cluster composed of pieces of news generated within a first preset time length, the piece of news in the news cluster direct to a given news event; a target news cluster determining unit, configured to determine a target news cluster based on the at least one news cluster; a target news cluster determining unit, configured to determine a target news cluster based on the at least one news cluster and a commentary generating unit, configured to generate, based on a piece of target news, a commentary for the target news cluster, wherein the piece of target news is a piece of news having a highest score of being suitable for generating a commentary in the target news cluster.

In some embodiments, the apparatus further includes: a speech and/or video generating unit, configured to generate a speech and/or a video corresponding to the commentary.

In some embodiments, the apparatus further includes: a sending unit, configured to send the speech and/or video corresponding to the commentary to a terminal device, so that the terminal device presents the received speech and/or video.

In some embodiments, the target news cluster determining unit is further configured to: determine each of the at least one news cluster as the target news cluster.

In some embodiments, the target news cluster determining unit is further configured to: sort respective news clusters in the at least one news cluster in descending order according to the number of news generated within a recent second preset time length in the news clusters; and determine each news cluster sorted within a preset sorting range in the at least one news cluster as the target news cluster.

In some embodiments, the target news cluster determining unit is further configured to: determine each high-quality news cluster in the at least one news cluster as the target news cluster, wherein a number of images comprised in the news of the high-quality news cluster is greater than a preset minimum number of images and a number of videos comprised is greater than a preset minimum number of videos.

In some embodiments, the target news cluster determining unit is further configured to: determine, for each of the at least one news cluster, a news event topic corresponding to the news cluster and a current frequency of occurrence of the determined news event topic based on the pieces of news in the news cluster; determine frequency differences between current frequencies of occurrence of the news event topics corresponding to the at least one news cluster and historical frequency of occurrences of the news event topic; and determine, in the at least one news cluster, a news cluster with a frequency difference of a corresponding news event topic being greater than a preset frequency difference threshold as the target news cluster.

In some embodiments, the commentary generating unit includes: a target text determining module, configured to determine the text comprised in the target news as a target text; a deleting module, configured to delete a text unsuitable for a commentary from the target text, wherein the text unsuitable for a commentary is a text in a predetermined set texts unsuitable for a commentary; a replacing module, configured to replace the written language comprised in the target text with a spoken language of an identical semantics; a commentary determining module, configured to determine a digest text obtained by extracting a digest from the target text as the commentary of the target news cluster.

In some embodiments, the commentary determining module is further configured to: determine a maximum number of characters for the commentary according to a preset highest speech rate and a preset longest audio duration; extract a digest from the target text, the extracted digest text having fewer characters than the maximum number of characters of the commentary; and determine the extracted digest text as the commentary of the target news cluster.

In some embodiments, the score determining unit is further configured to: extract a feature value of the piece of news under at least one feature; and determine, based on the extracted at least one feature value, a score of being suitable for generating a commentary for the piece of news.

In some embodiments, the score determining unit is further configured to: input the text comprised in the piece of news into a pre-trained score calculation model to obtain a score of being suitable for generating a commentary for the piece of news, wherein the score calculation model is used to characterize a corresponding relationship between a text and a score of being suitable for generating a commentary for the text.

According to a third aspect, some embodiments of the present disclosure provide a server, including one or more processors; and a storage apparatus, storing one or more programs, the one or more programs, when executed by the one or more processors, causing the one or more processors to implement the method according to anyone of the implementations in the first aspect.

According to a fourth aspect, some embodiments of the present disclosure provide a computer-readable storage medium, storing a computer program thereon, where the computer program, when executed by one or more processors, implements the method according to any one of the implementations in the first aspect.

According to a fifth aspect, some embodiments of the present disclosure provide another server, including: an interface; a storage apparatus, storing one or more computer program; and one or more processor, operatively connected to the interface and the storage apparatus, used for: acquiring at least one news cluster composed of pieces of news generated within a first preset time length, the pieces of news in the news cluster direct to a given news event; determining a target news cluster based on the at least one news cluster; for each piece of news in the target news cluster, determining for the piece of news a score of being suitable for generating a commentary; and generating, based on a piece of target news, a commentary for the target news cluster, wherein the piece of target news is a piece of news having a highest score of being suitable for generating a commentary in the target news cluster.

According to a sixth aspect, some embodiments of the present disclosure provide a computer-readable storage medium, storing a computer program thereon, where the computer program, when executed by one or more processors, cause the one or more processors to: acquire at least one news cluster composed of pieces of news generated within a first preset time length, the pieces of news in the news cluster direct to a given news event; determine a target news cluster based on the at least one news cluster; for each piece of news in the target news cluster, determining for the piece of news a score of being suitable for generating a commentary; and generate, based on a piece of target news, a commentary for the target news cluster, wherein the piece of target news is a piece of news having a highest score of being suitable for generating a commentary in the target news cluster.

At present, when commentaries are generated for news clusters, corresponding commentaries are generated for news clusters direct to respective news events in the prior art, and the generation of the commentaries for the respective news clusters occupies CPU (Central Processing Unit) resources, storage resources (for example, memory resources and hard disk resources), and I/O (input/output) resources. In the method and apparatus for generating a commentary according to the embodiments of the present disclosure, a target news cluster is determined based on at least one news cluster, and a commentary is generated only for the determined target news cluster, not for each of the news clusters. That is, the number of news clusters for generating commentaries is reduced, thereby effectively reducing CPU resources, storage resources, and I/O resources that the entire process requires. Moreover, in the prior art, during commentaries being generated for a plurality of pieces of news for an identical news event, sentences extracted from the plurality of pieces of news are mostly spliced together, causing the problem of logical confusion or semantic difference. However, in the method and apparatus for generating a commentary according to the embodiments of the present disclosure, a commentary is generated based on the target news having the highest score of being suitable for generating a commentary, rather than that sentences extracted from the plurality of pieces of news in the target news cluster are spliced together, so the problem of logical confusion or semantic difference of the generated commentary can be reduced.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the some embodiments in the present disclosure and some features in the disclosure may be combined with each other on a non-conflict basis. Features of the present disclosure will be described below in detail with reference to the accompanying drawings and in combination with embodiments.

Figure 1:
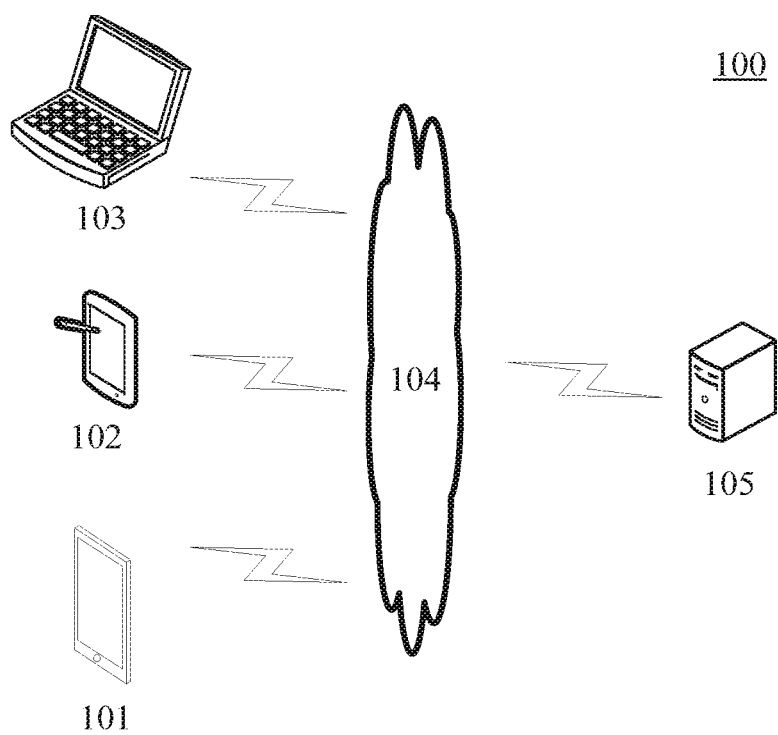
FIG. 1 is an architectural diagram of an example system to which embodiments of the present disclosure may be applied.

FIG. 1 shows an example system architecture 100 to which a method for generating a commentary or an apparatus for generating a commentary according to an embodiment of the present disclosure may be applied.

As shown in FIG. 1, the system architecture 100 may include a terminal device 101, 102 or 103, a network 104, and a server 105. The network 104 serves as a medium providing a communication link between the terminal device 101, 102 or 103 and the server 105. The network 104 may include various types of connections, such as wired or wireless communication links, or optical fiber cables.

A user may interact with the server 105 using the terminal device 101, 102 or 103 through the network 104 to receive or send messages, etc. The terminal device 101, 102 or 103 may be installed with various communication client applications, such as web browser applications, shopping applications, search applications, instant messaging tools, e-mail clients, and social platform software.

The terminal device 101, 102 or 103 may be hardware or software. When the terminal device 101, 102 or 103 is hardware, the terminal device may be various types of electronic devices with display screens, including but not limited to a smart phone, a tablet computer, an e-book reader, an MP3 (Moving Picture Experts Group Audio Layer III) player, an MP4 (Moving Picture Experts Group Audio Layer IV) player, a laptop computer, a desktop computer, etc. When the terminal device 101, 102 or 103 is software, the terminal device may be installed in the above-listed electronic devices. The terminal device 101 may be implemented as a plurality of software programs or software modules, or as a single software program or software module. Specific limitations are not provided here.

The server 105 may be a server providing various services, for example, a background website server providing a support for news websites displayed on the terminal device 101, 102 or 103. The background website server may analyze and process the received data such as a news page request, and feed the processing result (e.g., news web page data) back to the terminal device 101, 102 or 103.

It should be noted that the method for generating a commentary according to some embodiments of the present disclosure may be performed by the server 105. Accordingly, the apparatus for generating a commentary may be provided in the server 105.

It should be noted that the server 105 may be hardware or software. When the server 105 is hardware, the server 105 may be implemented as a distributed server cluster composed of multiple servers, or as a single server. When the server 105 is software, the server 105 may be implemented as a plurality of software programs or software modules (e.g., for providing news web page services), or as a single software program or software module, which is not specifically limited herein.

It should be understood that the numbers of the terminal devices, the network and the server in FIG. 1 are merely illustrative. Any number of terminal devices, networks and servers may be provided based on actual requirements.

Figure 2A:
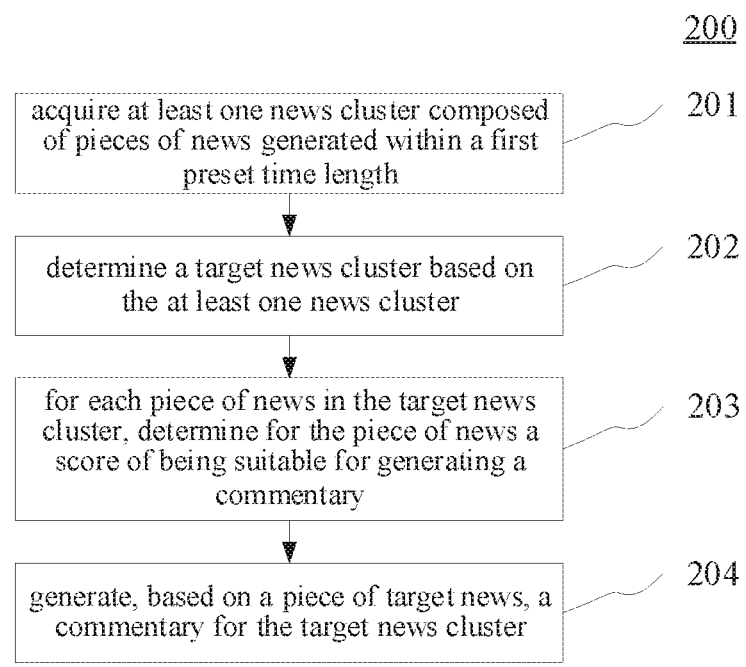
FIG. 2A is a flowchart of a method for generating a commentary according to an embodiment of the present disclosure.

Further, referring to FIG. 2A, a flow 200 of a method for generating a commentary according to an embodiment of the present disclosure is shown. The method for generating a commentary includes the following steps.

Step 201: acquiring at least one news cluster composed of pieces of news generated within a first preset time length.

In the present embodiment, the executing body (for example, the server 105 shown in FIG. 1) of the method for generating a commentary may locally or remotely acquire the at least one news cluster composed of pieces of news generated within the recent first preset time length from an electronic device connected to the executing body via a network, where the pieces of news in each news cluster are directed to a given news event, and different news clusters are directed to different news events.

The news event refers to an event that has occurred recently within a third preset time length (for example, within three months).

The news may be electronic data for the news event in various forms, and the news may be marked with a corresponding generation time. The news may include at least one of the following: text, image, audio, or video. For example, the news may be a web page or various documents, and the document may include at least one of the following: text, image, audio, or video. The news may also be just text, image or video.

In practice, the acquired news may be marked with a corresponding news event. In this way, the executing body may first acquire at least one piece of news generated within the recent first preset time length (for example, within one day), and then compose the acquired at least one piece of news into different news clusters according to different news events.

It can be understood that, when the acquired news is not marked with a corresponding news event, the executing body may first acquire the pieces of news generated within the recent first preset time (for example, within one day), and then cluster the acquired pieces of news by various implementations, where the news clustered into same one class constitutes a news cluster, the news clustered into different classes belongs to different news clusters, and at least one news cluster can be obtained accordingly. For example, in practice, news generally has a news headline, the executing body may cluster the news headlines of the acquired respective pieces of news, and the cluster of the news headlines is used as the cluster of the news corresponding to the news headlines.

Step 202: determining a target news cluster based on the at least one news cluster.

In the present embodiment, the executing body (for example, the server shown in FIG. 1) may determine the target news cluster based on the at least one news cluster by various implementations.

Here, the target news cluster may be one news cluster or at least two news clusters.

When the target news cluster is one news cluster, the executing body may perform step 203 and step 204 using the determined news cluster as the target news cluster.

When the determined target news cluster contains at least two news clusters, the executing body may take the each of the determined at least two news clusters respectively as a target news cluster to perform step 203 and step 204. That is, if the determined target news cluster contains N (N is a positive integer more than 2) news clusters, the executing body may take each of the determined N news clusters respectively as a target news cluster to perform step 203 and step 204.

In some alternative implementations of the present embodiment, step 202 may be implemented as follows.

First, respective news clusters in the at least one news cluster determined in step 201 are sorted in descending order according to the number of news generated within a recent second preset time in the news clusters.

Here, the second preset time may be same as or different from the first preset time.

Second, each news cluster sorted within a preset sorting range in the at least one news cluster is determined as the target news cluster.

Here, the preset sorting range may be in various forms. For example, the preset sorting range may be a scale or a percentage. As an example, the preset sorting range may be first 10% to first 20%. For another example, the sorting range may also be a sorting number range. As an example, the preset sorting range may be top 10 to top 20 of the sorting number.

In practice, in the target news clusters determined according to the preset sorting range, the news clusters of the most and least news generated within a recent second preset time length in the at least one news cluster may be removed. That is, the target news clusters are not for the hottest or coldest news events, but medium hot news events. For a hottest news event, most people already know about this news event, and the probability that users read the commentary generated for the hottest news event may be lower, so a commentary is generated for a news cluster corresponding to a medium hot news event, which can reduce the consumption of resources (such as CPU resources, storage resources, and I/O resources). On the contrary, for a coldest news event, everyone is not interested in this news event, and almost nobody knows this news event; even if a commentary is generated for the coldest news event, users will not be interested in it, and the probability that users read the commentary generated for the coldest news event is also lower, so a commentary is not generated for a news cluster corresponding to the coldest news event, which can also reduce the consumption of resources (such as CPU resources, storage resources, and I/O resources). It can be understood that the hottest news event or the coldest news event here may be at least one news event.

In some alternative implementations of the present embodiment, step 202 may also be implemented as follows.

Each high-quality news cluster in the at least one news cluster is determined as the target news cluster.

Here, the number of images included in the news of the high-quality news cluster is greater than a preset minimum number of images, and the number of videos included is greater than a preset minimum number of videos. For example, the preset minimum number of images and the preset minimum number of videos may be 5.

Here, the preset minimum number of images and the preset minimum number of videos may be preset by a technician based on statistical analysis on a large amount of historical news. The preset minimum number of images and the preset minimum number of videos may also be reset as needed.

In practice, if news in a news cluster includes more images and more videos, the news cluster is more vivid and interesting and easily arouses users' reading interest, and a commentary generated for such news cluster also arouses the users' interest, which in turn increases the probability of that users read the commentary generated for the high-quality news cluster. Therefore, the generation of a commentary only for a high-quality news cluster can reduce the consumption of resources (such as CPU resources, storage resources, and I/O resources).

In some alternative implementations of the present embodiment, step 202 may also be implemented as follows.

First, for each of the at least one news cluster, determining a news event topic corresponding to the news cluster and a current frequency of occurrence of the determined news event topic are determined based on the pieces of news in the news cluster.

Here, the news event topic corresponding to the news cluster and the current frequency of occurrence of the determined news event topic may be determined by various implementations. The news event topic corresponding to the news cluster represents the semantics expressed by the news in the news cluster. In practice, a news event topic may include at least one word or phrase. The current frequency of occurrence of the determined news event topic refers to a frequency of occurrence of the determined news event topic in the news of the news cluster.

For example, based on pieces of news in the news cluster determined in step 201, news event topics corresponding to the pieces of news in the news cluster may be determined using an LDA (Latent Dirichlet Allocation), and a probability distribution value of the determined news event topic is determined as the current frequency of occurrence of the determined news event topic.

Second, frequency differences between the current frequencies of occurrence of the news event topics corresponding to the at least one news cluster and the historical frequencies of occurrence of the news event topics are determined.

Here, the historical frequency of occurrence of a news event may be determined based on the historical news having the identical news event topic as the news cluster.

Finally, in the at least one news cluster, a news cluster with a frequency difference of a corresponding news event topic being greater than a preset frequency difference threshold is determined as the target news cluster.

If a frequency difference of the news event topic is greater than the preset frequency difference threshold, the news event itself corresponding to the news cluster is not prominent, but has received a sudden attention, then this news cluster should be paid attention to, and the commentary generated for such news cluster may be read by more users.

It should be noted that the executing body may also determine the target news cluster using at least two implementations of the first, second, and third alternative implementations.

Step 203: for each piece of news in the target news cluster, determining for the piece of nes a score of being suitable for generating a commentary.

In the present embodiment, the executing body of the method for generating a commentary may determine, for each piece of news in the target news cluster, the score of being suitable for generating a commentary for the piece of news by various implementations.

In some alternative implementations of the present embodiment, step 203 may be implemented as follows.

First, a feature value of the piece of news under at least one feature is extracted.

For example, the at least one feature may include, but is not limited to, the following features: the number of characters included in the piece of news, the number of different words included in the piece of news, the number of images included in the piece of news, the number of videos included in the piece of news, the number of times that the piece of news is read, the number of times that the piece of news is forwarded, the sum of characters included in the pieces of news of the target news cluster, the sum of different words included in the pieces of news of the target news cluster, the sum of images included in the pieces of news of the target news cluster, the sum of videos included in the pieces of news of the target news cluster, the sum of times that the pieces of news in the target news cluster is read, and the sum of times that the pieces of news in the target news cluster is forwarded.

Second, a score of being suitable for generating a commentary is determined for the piece of news based on the extracted at least one feature value.

The score of being suitable for generating a commentary may be determined for the piece of news by various implementations based on the extracted at least one feature value.

For example, the extracted at least one feature value may be weighted and summed according to weights preset for the features, and the result of weighted summation may be determined as the score of being suitable for generating a commentary for the piece of news.

For another example, the following ratio may also be first determined:

(1) The ratio of the number of characters included in the piece of news to the sum of characters included in the pieces of news of the target news cluster;

(2) The ratio of the number of different words included in the piece of news to the sum of different words included in the pieces of news of the target news cluster;

(3) The ratio of the number of images included in the piece of news to the sum of images included in the pieces of news of the target news cluster;

(4) The ratio of the number of videos included in the piece of news to the sum of videos included in the pieces of news of the target news cluster;

(5) The ratio of the number of times that the piece of news is read to the sum of times that the pieces of news in the target news cluster are read;

(6) The ratio of the number of times that the piece of news is forwarded to the sum of times that the pieces of news in the target news cluster are forwarded.

Then, the ratios determined above may be weighted and summed according to the weights predetermined for the ratios, and the result of weighted summation may be determined as the score of being suitable for generating a commentary for the piece of news.

In some alternative implementations of the present embodiment, step 203 may also be implemented as follows.

The text included in the piece of news is input into a pre-trained score calculation model to obtain a score of being suitable for generating a commentary for the piece of news.

Here, the score calculation model is used to characterize a corresponding relationship between a text and a score of being suitable for generating a commentary for the text.

As an example, the score calculation model may be a corresponding relationship table pre-created by a technician based on a large number of statistics on the feature vectors obtained by performing feature extraction on the texts and labeling results of the scores of being suitable for generating a commentary for the texts, and the table stores corresponding relationships between a plurality of feature vectors and scores of being suitable for generating a commentary; or a calculation formula for performing numerical calculation on one or more values in the feature vectors obtained by feature extraction on the texts to obtain a score for characterizing that the text is suitable for generating the commentary, the calculation formula may be preset by a technician based on the statistics on a large amount of data and stored to the electronic device.

In some implementations, the executing body may train the score calculation model in advance according to the following steps.

First, a set of training samples may be acquired.

A training sample may include a text included in historical news and a labeling score of being suitable for generating a commentary corresponding to the historical news. For example, the score of suitable for generating a commentary for the historical news may be labeled manually.

Second, a model structure of an initial score calculation model may be determined and model parameters of the initial score calculation model may be initialized.

In the present embodiment, the executing body for training the score calculation model may be the same as or different from the executing body of the method for generating a commentary. If same, the executing body for training the score calculation model may store, after training the score calculation model, model structure information and model parameter values of the trained score calculation model locally. If different, the executing body for training the score calculation model may send, after training the score calculation model, model structure information and model parameter values of the trained score calculation model to the executing body of the method for generating a commentary.

Since the score calculation model may include various types of calculation models, the model structure information that needs to be determined is different for different types of calculation models.

Alternatively, the initial score calculation model may include a convolutional neural network. The convolutional neural network is a multi-layer neural network, each layer consists of a plurality of two-dimensional planes, and each plane consists of a plurality of independent neurons, so it needs to be determined here which layers (e.g., convolutional layers, pooling layers, excitation function layers, etc.) the initial score calculation model of the convolutional neural network type includes, in which order that the layers are connected, which parameters (e.g., a weight, a bias, and a step length of convolutions) each of the layers include, etc. The convolutional layers may be used to extract features. For each convolutional layer, how many convolution kernels, the sizes of convolution kernels, the weights of neurons in each of the convolution kernels, the biases corresponding to each of the convolution kernels, the step length between two adjacent convolutions, whether filling is required, how many pixels are filled and the values used for filling (usually the value used for filling is 0), and the like may be determined. The pooling layers may be used to down sample the input information, to compress the amount of data and parameters and reduce over-fitting. For each pooling layer, a pooling method (for example, taking a regional average or taking a regional maximum) for the pooling layer may be determined. The excitation function layers are used to perform nonlinear calculation on the input information. A specific excitation function may be determined for each excitation function layer. For example, the activation function may be a ReLU and various variant activation functions of the ReLU, a Sigmoid function, a Tanh (hyperbolic tangent) function, a Maxout function, and the like.

Then, the model parameters of the initial score calculation model may be initialized. In practice, the model parameters of the initial score calculation model may be initialized with some different small random numbers. The "small random numbers" are used to ensure that the model would not enter saturation state due to oversize weights, which would cause training failure, and the "different" is used to ensure that the model can learn normally.

Next, the initial score calculation model is trained using a machine learning method, by using the texts included in the historical news in the training sample in the set of training samples and the scores of being suitable for generating a commentary corresponding to the historical news respectively as inputs and desired outputs of the initial score calculation model.

Specifically, a text included in a piece of historical news in the training sample in the set of training samples may be first input into the initial score calculation model, to obtain a score corresponding to the text included in the historical news. Then, the difference between the obtained score and the labeling score in the training sample may be calculated. Finally, the model parameters of the initial score calculation model may be adjusted based on the calculated difference, and the training ends if a preset training end condition is satisfied. For example, the preset training end condition here may include at least one of the following: the training time exceeds a preset time length, the number of trainings exceeds a preset number, and the calculated difference is smaller than a preset difference threshold.

The model parameters of the initial score calculation model may be adjusted by various implementations based on the difference between the obtained score and the labeling score in the training sample. For example, stochastic gradient descent (SGD), a Newton's method, quasi-Newton methods, conjugate gradient, heuristic optimization, and other existing known or future developed various optimization algorithms may be used.

Finally, the trained initial score calculation model may be determined as a pre-trained score calculation model.

Step 204: generating, based on target news, a commentary of the target news cluster.

The scores of being suitable for generating a commentary of respective pieces of news in the target news cluster is determined. Here, the executing body may first determine the news having the highest score of being suitable for generating a commentary in the target news cluster as the target news. Then, the commentary of the target news cluster is generated by various implementations based on the target news.

In some alternative implementations of the present embodiment, step 204 may be performed as follows: performing digest extraction on the text included in the target news, and determining the digest text obtained by the digest extraction as the commentary of the target news cluster.

Figure 2B:
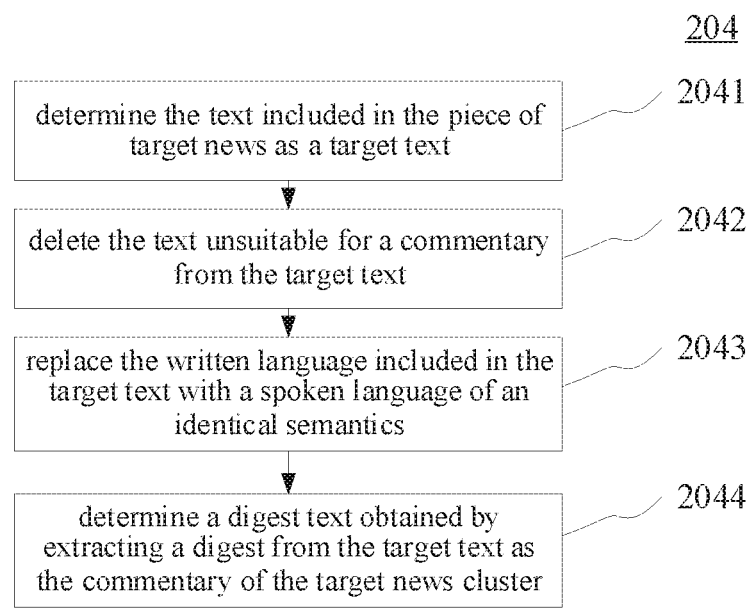
FIG. 2B is an exploded flowchart of step 204 according to an embodiment of the present disclosure.

In some alternative implementations of the present embodiment, step 204 may also include step 2041 to step 2044 as shown in FIG. 2B.

Referring to FIG. 2B, an exploded flowchart of step 204 according to an embodiment of the present disclosure is shown.

Step 2041: determining the text included in the piece of target news as a target text.

Here, the executing body may first determine the news having the highest score of being suitable for generating a commentary in the target news cluster as the target news. Then, the text included in the target news may be determined as the target text.

Step 2042: deleting a text unsuitable for commentary from the target text.

Here, the executing body may delete the text unsuitable for commentary from the target text. The text unsuitable for commentary may be a text in a predetermined set of texts unsuitable for commentary. In practice, the set of texts unsuitable for commentary may be a set of texts pre-created by a technician based on the statistics on texts unsuitable for commentary (for example, "Reporter news", "Please look at the picture above", "Please look at the picture below", "Reports from front reporters", "Big news from front reporters", "Reported by front reporters", "News reporters interviewed live audiences", etc.) extracted from a large amount of historical news.

After step 2042, invalid information in the target text may be reduced, and then the proportion of valid information in the commentary finally generated may be increased.

Step 2043: replacing the written language included in the target text with a spoken language of identical semantics.

Here, the executing body may replace the written language included in the target text with a spoken language of identical semantics by various implementations. The written language and the spoken language may be the ones in a predetermined written language and spoken language corresponding relationship table. In practice, the written language and spoken language corresponding relationship table may be a corresponding relationship table pre-created by a technician based on the statistics on written languages extracted from a large amount of corpus and spoken languages corresponding to the identical semantics.

After step 2043, the written language in the target text is replaced with the spoken language, so that the target text is more suitable for being used as a commentary.

Step 2044: determining the digest text obtained by performing digest extraction on the target text as the commentary of the target news cluster.

In some implementations, the executing body may directly determine the digest text obtained by extracting the digest from the target text as the commentary of the target news cluster.

In some implementations, step 2044 may also be performed as follows.

First, determining a maximum number of characters of the commentary according to a preset highest speech rate and a preset longest audio duration.

The preset highest speech rate is used to characterize, if a corresponding speech is to be generated for the commentary, the maximum number of characters included in unit time (for example, 1 second) of the generated speech.

The preset longest audio duration is used to characterize, if a corresponding speech is to be generated for the commentary, the longest playing duration of the generated speech. For example, if a corresponding short video is to be generated for the commentary, the preset longest audio duration may be 90 seconds.

The preset highest speech rate and the preset longest audio duration may be predetermined by a technician. Of course, an interface for modifying the preset highest speech rate and the preset longest audio duration may also be provided to modify the preset highest speech rate and the preset longest audio duration.

With the preset highest speech rate and the preset longest audio duration, the product of the preset highest speech rate and the preset longest audio duration may be determined as the maximum number of characters of the commentary.

Second, performing a digest extraction on the target text.

The digest may be extracted from the target text by various implementations, and the extracted digest text has characters fewer than the determined maximum number of characters of the commentary.

Finally, the extracted digest text is determined as the commentary of the target news cluster.

The extracted digest text having characters fewer than the maximum number of characters of the commentary may be determined as the commentary of the target news cluster.

The number of characters of the commentary determined according to the above implementation can meet the requirements of the preset highest speech rate and the preset longest audio duration.

It should be noted that the extraction of the digest from the text is the existing technology that has been widely studied and applied, and details are not described herein again.

With step 204 implemented using the alternative implementation shown in FIG. 2B, the portion of text unsuitable for commentary can be reduced from the text included in the target news, and the portion of text suitable for commentary is then increased. In addition, the written language is replaced with the spoken language, so that the text included in the target news is more suitable for generating a commentary in accordance with human spoken habits.

Figure 3:
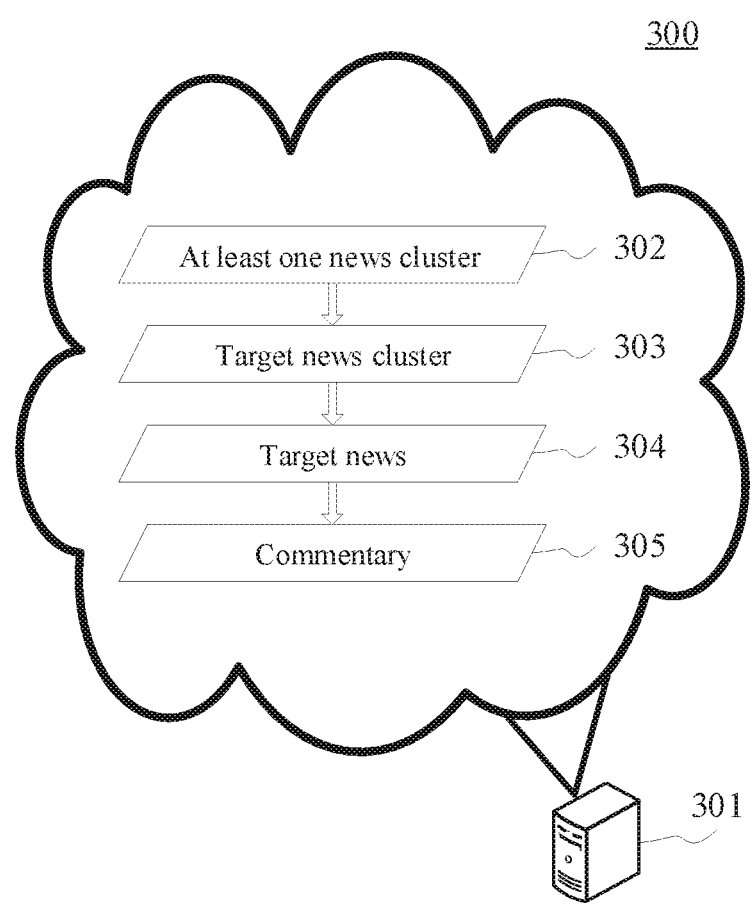
FIG. 3 is a schematic diagram of an application scenario of the method for generating a commentary according to some embodiments of the present disclosure.

Further referring to FIG. 3, which is a schematic diagram of an application scenario of the method for generating a commentary according to some embodiments of the present embodiment. In the application scenario of FIG. 3, a server 301 that provides support for a news website may first acquire at least one news cluster 302 composed of pieces of news generated within a recent first preset time length (for example, 1 day); thereafter, the server 301 determines a target news cluster 303 based on the at least one news cluster 302; then, the server 301 determines, for each piece of news in the target news cluster 303, a score of being suitable for generating a commentary for the piece of news; finally, the server 301 generates a commentary 305 for the target news cluster based on target news 304.

Generally, when commentaries are generated for news clusters, corresponding commentaries are generated for news clusters direct to respective news events, and the generation of the commentaries for the respective news clusters occupies CPU resources, storage resources, and I/O resources. In the method for generating a commentary according to the above embodiments of the present disclosure, a target news cluster is determined based on at least one news cluster, and a commentary is generated only for the determined target news cluster, not for each of the news clusters. That is, the number of news clusters for generating commentaries is reduced, thereby effectively reducing CPU resources, storage resources, and I/O resources that the entire process requires. Moreover, in the prior art, during commentaries being generated for a plurality of pieces of news for an identical news event, sentences extracted from the plurality of pieces of news are mostly spliced together, causing the problem of logical confusion or semantic difference. However, in the method for generating a commentary according to the above embodiments of the present disclosure, a commentary is generated based on the target news having the highest score of being suitable for generating a commentary, rather than that sentences extracted from the plurality of pieces of news in the target news cluster are spliced together, so the problem of logical confusion or semantic difference of the generated commentary can be reduced.

Figure 4:
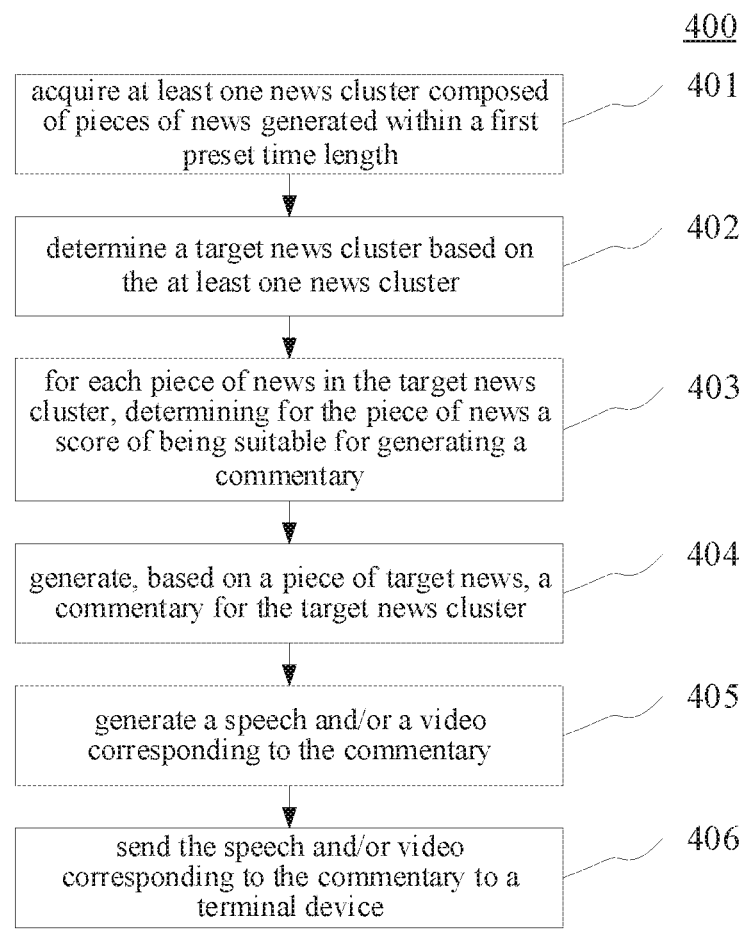
FIG. 4 is a flowchart of the method for generating a commentary according to another embodiment of the present disclosure.

Further referring to FIG. 4, a flow 400 of another embodiment of the method for generating a commentary is shown. The flow 400 of the method for generating a commentary includes the following steps.

Step 401: acquiring at least one news cluster composed of pieces of news generated within a first preset time length.

Step 402: determining a target news cluster based on the at least one news cluster.

Step 403: for each piece of news in the target news cluster, determining for the piece of news a score of being suitable for generating a commentary.

Step 404: generating, based on a piece of target news, a commentary for the target news cluster.

In the present embodiment, the specific operations of step 401, step 402, step 403, and step 404 are substantially the same as the operations of step 201, step 202, step 203, and step 204 in the embodiment shown in FIG. 2, and details are not described herein again.

Step 405: generating a speech and/or a video corresponding to the commentary.

In the present embodiment, the executing body (for example, the server 105 shown in FIG. 1) of the method for generating a commentary may generate, after generating the commentary for the target news cluster in step 404, the speech and/or the video corresponding to the commentary of the target news cluster generated in step 404.

Here, the executing body may generate the speech corresponding to the commentary for the target news cluster by using a speech synthesis technology.

It should be noted that the speech synthesis technology is the existing technology that has been widely studied and applied, and details are not described herein again.

Here, the executing body may generate the video corresponding to the commentary of the target news cluster by various implementations.

For example, the executing body may generate the video corresponding to the commentary for the target news cluster as follows.

First, the commentary of the target news cluster may be segmented into at least one sentence.

Second, speeches corresponding to the sentences obtained by the segmentation may be generated using a speech synthesis technology.

Third, a corresponding image may be generated for each of the sentences obtained by the segmentation. For example, the generated image presents the sentence, or presents the objects involved in the sentence.

Finally, a video corresponding to the commentary of the target news cluster may be generated in the order of the sentences obtained by the segmentation in the commentary, where the generated speech corresponding to a sentence is used as an audio portion corresponding to the sentence in the generated video, and the video at the playback duration of the speech corresponding to the playback of the generated image corresponding to the sentence is used as a video portion corresponding to the sentence.

Step 406: sending the speech and/or video corresponding to the commentary to a terminal device.

In the present embodiment, the executing body may send the speech and/or video generated in step 405 corresponding to the commentary to the terminal device. Here, the terminal device may be an electronic device connected to the executing body via a network. In this way, the terminal device may present the received speech and/or video in response to receiving the speech and/or video sent by the executing body, and the speech and/or video corresponding to the commentary of the target news cluster are presented on the terminal device accordingly. The user can quickly learn the news event being directed to by the target news cluster by listening to or watching the presented speech and/or video corresponding to the commentary of the target news cluster on the terminal device, without reading the text, thereby improving the efficiency of the user to gain the news event.

It can be seen from FIG. 4 that, compared with the embodiment corresponding to FIG. 2A, the flow 400 of the method for generating a commentary in the present embodiment adds the steps of generating a corresponding speech and/or video for the commentary of the target news cluster, and sending the speech and/or video corresponding to the commentary to the terminal device. Thus, the solution described in the present embodiment can present the received speech and/or video corresponding to the target news cluster at the terminal device. The user can quickly learn the news event being directed to by the target news cluster by listening to or watching the presented speech and/or video corresponding to the commentary of the target news cluster on the terminal device, without reading the text, thereby improving the efficiency of gaining the news event through the terminal device, that is, extending the function of the terminal device to present information.

Figure 5:
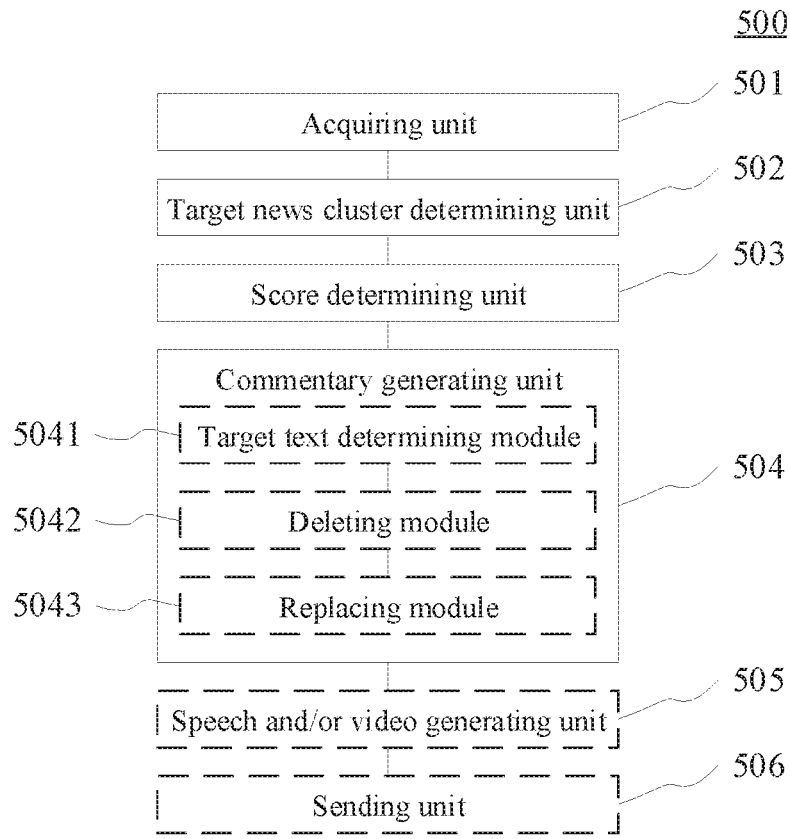
FIG. 5 is a schematic structural diagram of an apparatus for generating a commentary according to an embodiment of the present disclosure.

Further, referring to FIG. 5, as an implementation of the method shown in the above figures, some embodiments of the present disclosure provide an apparatus for generating a commentary. The embodiments of the apparatus corresponds to the embodiments of the method shown in FIG. 2A, and the apparatus may be applied to various electronic devices.

As shown in FIG. 5, the apparatus 500 for generating a commentary in the present embodiment includes: an acquiring unit 501, a target news cluster determining unit 502, a score determining unit 503, and a commentary generating unit 504. The acquiring unit 501 is configured to acquire at least one news cluster composed of pieces of news generated within a first preset time length, the pieces of news in the news cluster direct to a given news event; the target news cluster determining unit 502 is configured to determine a target news cluster based on the at least one news cluster; the score determining unit 503 is configured to determine, for each piece of news in the target news cluster, a score of being suitable for generating a commentary for the piece of news; and the commentary generating unit 504 is configured to generate, based on a piece of target news, a commentary for the target news cluster, where the piece of target news is a piece of news having a highest score of being suitable for generating a commentary in the target news cluster.

In the present embodiment, the specific processing of the acquiring unit 501, the target news cluster determining unit 502, the score determining unit 503, and the commentary generating unit 504 of the apparatus 500 for generating a commentary and the technical effects thereof may be referred to the related description in step 201, step 202, step 203, and step 204 in the corresponding embodiment of FIG. 2A, respectively. The description will not be repeated here.

In some alternative implementations of the present embodiment, the apparatus 500 may further include: a speech and/or video generating unit 505, configured to generate a speech and/or a video corresponding to the commentary.

In some alternative implementations of the present embodiment, the apparatus 500 may further include: a sending unit 506, configured to send the speech and/or video corresponding to the commentary to a terminal device, so that the terminal device presents the received speech and/or video.

In some alternative implementations of the present embodiment, the target news cluster determining unit 502 may be further configured to: determine each of the at least one news cluster as the target news cluster.

In some alternative implementations of the present embodiment, the target news cluster determining unit 502 may be further configured to: sort respective news clusters in the at least one news cluster in descending order according to the number of news generated within a recent second preset time length in the news clusters; and determine each news cluster sorted within a preset sorting range in the at least one news cluster as the target news cluster.

In some alternative implementations of the present embodiment, the target news cluster determining unit 502 may be further configured to: determine each high-quality news cluster in the at least one news cluster as the target news cluster, where the number of images included in the news of the high-quality news cluster is greater than a preset minimum number of images and the number of videos included is greater than a preset minimum number of videos.

In some alternative implementations of the present embodiment, the target news cluster determining unit 502 may be further configured to: determine, for each of the at least one news cluster, a news event topic corresponding to the news cluster and a current frequency of occurrence of the determined news event topic based on the piece of news in the news cluster; determine frequency differences between current frequencies of occurrence of the news event topics corresponding to the at least one news cluster and historical frequency of occurrence of the news event topics; and determine, in the at least one news cluster, a news cluster with a frequency difference of a corresponding news event topic being greater than a preset frequency difference threshold as the target news cluster.

In some alternative implementations of the present embodiment, the commentary generating unit 504 may include: a target text determining module 5041, configured to determine the text included in the target news as a target text; a deleting module 5042, configured to delete a text unsuitable for a commentary from the target text, where the text unsuitable for a commentary t is a text in a predetermined set of texts unsuitable for a commentary; a replacing module 5043, configured to replace the written language included in the target text with a spoken language of an identical semantics; and a commentary determining module 5044, configured to determine a digest text obtained by extracting a digest from the target text as the commentary of the target news cluster.

In some alternative implementations of the present embodiment, the commentary determining module 5044 may be further configured to: determine a maximum number of characters for the commentary according to a preset highest speech rate and a preset longest audio duration; extract a digest from the target text, the extracted digest text having fewer characters than the maximum number of characters of the commentary; and determine the extracted digest text as the commentary of the target news cluster.

In some alternative implementations of the present embodiment, the score determining unit 503 may be further configured to: extract a feature value of the piece of news under at least one feature; and determine, based on the extracted at least one feature value, a score of being suitable for generating a commentary for the piece of news.

In some alternative implementations of the present embodiment, the score determining unit 503 may be further configured to: input the text included in the piece of news into a pre-trained score calculation model to obtain a score of being suitable for generating a commentary for the piece of news, where the score calculation model is used to characterize a corresponding relationship between a text and a score of being suitable for generating a commentary for the text.

It should be noted that the implementation details of the units in the apparatus for generating a commentary according to some embodiments of the present disclosure and the technical effects thereof may be referred to the descriptions of other embodiments in the present disclosure, and details are not described herein again.

Figure 6:
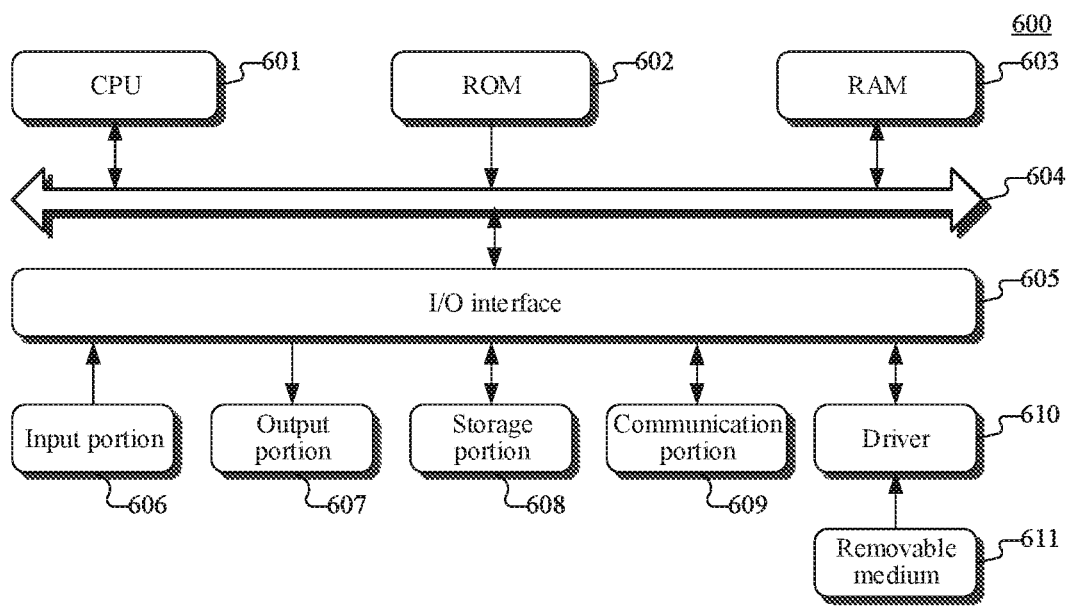
FIG. 6 is a schematic structural diagram of a computer system adapted to implement a server of embodiments of the present disclosure.

Referring to FIG. 6, a schematic structural diagram of a computer system 600 adapted to implement a server of the embodiments of the present disclosure is shown. The server shown in FIG. 6 is merely an example, and should not limit the function and scope of use of the embodiments of the present disclosure.

As shown in FIG. 6, the computer system 600 includes one or more Central Processing Units (CPUs) 601, which can execute various appropriate operations and processes based on programs stored in a Read Only Memory (ROM) 602 or programs loaded from a storage portion 608 to a Random Access Memory (RAM) 603. The RAM 603 also stores various programs and data required by operations of the system 600. The CPU 601, the ROM 602, and the RAM 603 are connected to each other through a bus 604. An Input/Output (I/O) interface 605 is also connected to the bus 604.

The following components are connected to the I/O interface 605: an input portion 606 including a keyboard, a mouse, or the like; an output portion 607 including a Cathode Ray Tube (CRT), a Liquid Crystal Display (LCD), a speaker, or the like; a storage portion 608 including a hard disk or the like; and a communication portion 609 including a network interface card, such as a Local Area Network (LAN) card and a modem. The communication portion 609 performs communication processes via a network, such as the Internet. A driver 610 is also connected to the I/O interface 605 as required. A removable medium 611 such as a magnetic disk, an optical disk, a magneto-optical disk or a semiconductor memory is installed on the driver 610 as needed, so that a computer program read therefrom is installed in the storage portion 608 as needed.

In particular, according to some embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 609, or may be installed from the removeable medium 611. The computer program, when executed by the central processing unit (CPU) 601, implements the above mentioned functionalities as defined by the methods of the present disclosure. It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, including an acquiring unit, a target news cluster determining unit, a score determining unit, and a commentary generating unit. Here, the names of these units do not in some cases constitute a limitation to such units themselves. For example, the acquiring unit may also be described as "a unit configured to acquire at least one news cluster composed of news generated within a first preset time".

In another aspect, some embodiments of the present disclosure further provide a computer-readable medium. The computer-readable medium may be the computer computer-readable medium included in the apparatus in the above described embodiments, or a stand-alone computer-readable medium not assembled into the apparatus. The computer-readable medium stores one or more programs. The one or more programs, when executed by the apparatus, cause the apparatus to: acquire at least one news cluster composed of pieces of news generated within a first preset time length, the pieces of news in the news cluster direct to a given news event; determine a target news cluster based on the at least one news cluster; determine, for each piece of news in the target news cluster, a score of being suitable for generating a commentary for the piece of news; and generate, based on a piece of target news, a commentary for the target news cluster, where the piece of target news is a piece of news having a highest score of being suitable for generating a commentary in the target news cluster.

In still another aspect, an embodiment of the present disclosure also provides another server, including: an interface; a memory, storing one or more programs thereon; and one or more processors operatively connected to the interface and the memory, and configured to: acquire at least one news cluster composed of pieces of news generated within a first preset time length, the pieces of news in the news cluster direct to a given news event; determine a target news cluster based on the at least one news cluster; determine, for each piece of news in the target news cluster, a score of being suitable for generating a commentary for the piece of news; and generate, based on a piece of target news, a commentary for the target news cluster, where the piece of target news is a piece of news having a highest score of being suitable for generating a commentary in the target news cluster.

In still another aspect, some embodiments of the present disclosure further provide a computer-readable storage medium. The computer-readable storage medium may be the computer computer-readable storage medium included in the apparatus in the above described embodiments, or a stand-alone computer-readable storage medium not assembled into the apparatus. The computer-readable storage medium stores one or more programs. The one or more programs, when executed by one or more processors, cause the processors to: acquire at least one news cluster composed of pieces of news generated within a first preset time length, the pieces of news in the news cluster direct to a given news event; determine a target news cluster based on the at least one news cluster; determine, for each piece of news in the target news cluster, a score of being suitable for generating a commentary for the piece of news; and generate, based on a piece of target news, a commentary for the target news cluster, where the piece of target news is a piece of news having a highest score of being suitable for generating a commentary in the target news cluster.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A computer-implemented method for generating a commentary, comprising:
   acquiring at least one news cluster composed of pieces of news generated within a first preset time length, the pieces of news in the news cluster direct to a given news event;
   determining a target news cluster based on the at least one news cluster;
   for each piece of news in the target news cluster, determining for the piece of news a score of being suitable for generating a commentary; and
   generating, based on a piece of target news, a commentary for the target news cluster, wherein the piece of target news is a piece of news having a highest score of being suitable for generating a commentary in the target news cluster;
   wherein the method further comprises: generating a speech and/or a video corresponding to the commentary; and sending the speech and/or video corresponding to the commentary to a terminal device, so that the terminal device presents the received speech and/or video;
   wherein the determining a target news cluster based on the at least one news cluster comprises:
      determining each high-quality news cluster in the at least one news cluster as the target news cluster, wherein each high-quality news cluster comprises pieces of news direct to the given news event, the pieces of news comprising images and videos, the images being not image frames in the videos, wherein a number of the images comprised in the pieces of news of the high-quality news cluster is greater than a preset minimum number of images, and a number of the videos comprised in the news of the high-quality news cluster is greater than a preset minimum number of videos.

2. The method according to claim 1, wherein the for each piece of news in the target news cluster, determining for the piece of news a score of being suitable for generating a commentary comprises:
   extracting a feature value of the piece of news under at least one feature; and
   determining, based on the extracted at least one feature value, a score of being suitable for generating a commentary for the piece of news.

3. The method according to claim 1, wherein the determining, for each piece of news in the target news cluster, a score of being suitable for generating a commentary for the piece of news comprises:
   inputting the text comprised in the piece of news into a pre-trained score calculation model to obtain a score of being suitable for generating a commentary for the piece of news, wherein the score calculation model is used to characterize a corresponding relationship between a text and a score of being suitable for generating a commentary for the text.

4. The method according to claim 1, wherein the generating, based on a piece of target news, a commentary of the target news cluster comprises:
   determining the text comprised in the target news as a target text;
   deleting a text unsuitable for a commentary from the target text, wherein the text unsuitable for a commentary is a text in a predetermined set of texts unsuitable for a commentary;
   replacing the written language included in the target text after deleting the text unsuitable for a commentary with a spoken language of an identical semantics; and
   determining a digest text obtained by extracting a digest from the target text including the replaced spoken language as the commentary of the target news cluster.

5. The method according to claim 4, wherein the determining a digest text obtained by extracting a digest from the target text including the replaced spoken language as the commentary of the target news cluster comprises:
   determining a maximum number of characters for the commentary according to a preset highest speech rate and a preset longest audio duration;
   extracting a digest from the target text, the extracted digest text having fewer characters than the maximum number of characters of the commentary; and
   determining the extracted digest text as the commentary of the target news cluster.

6. An apparatus for generating a commentary, comprising:
   at least one processor; and
   a memory storing instructions, the instructions when executed by the at least one processor, cause the at least one processor to perform operations, the operations comprising:
      acquiring at least one news cluster composed of pieces of news generated within a first preset time length, the piece of news in the news cluster direct to a given news event;
      determining a target news cluster based on the at least one news cluster;
      for each piece of news in the target news cluster, determining a score of being suitable for generating a commentary for the piece of news; and
      generating, based on a piece of target news, a commentary for the target news cluster, wherein the piece of target news is a piece of news having a highest score of being suitable for generating a commentary in the target news cluster;
   wherein the operations further comprise: generating a speech and/or a video corresponding to the commentary; and sending the speech and/or video corresponding to the commentary to a terminal device, so that the terminal device presents the received speech and/or video;
   wherein the determining a target news cluster based on the at least one news cluster comprises:
      determining each high-quality news cluster in the at least one news cluster as the target news cluster, wherein each high-quality news cluster comprises pieces of news direct to the given news event, the pieces of news comprising images and videos, the images being not image frames in the videos, wherein a number of the images comprised in the pieces of news of the high-quality news cluster is greater than a preset minimum number of images, and a number of videos the comprised in the pieces of news of the high-quality news cluster is greater than a preset minimum number of videos.

7. The apparatus according to claim 6, wherein the generating, based on a piece of target news, a commentary of the target news cluster comprises:
   determining the text comprised in the target news as a target text;

deleting a text unsuitable for a commentary from the target text, wherein the text unsuitable for a commentary is a text in a predetermined set of texts unsuitable for a commentary;

replacing the written language included in the target text after deleting the text unsuitable for a commentary with a spoken language of an identical semantics; and determining a digest text obtained by extracting a digest from the target text including the replaced spoken language as the commentary of the target news cluster.

8. The apparatus according to claim 7, wherein the determining a digest text obtained by extracting a digest from the target text including the replaced spoken language as the commentary of the target news cluster comprises:

determining a maximum number of characters for the commentary according to a preset highest speech rate and a preset longest audio duration;

extracting a digest from the target text, the extracted digest text having fewer characters than the maximum number of characters of the commentary; and determining the extracted digest text as the commentary of the target news cluster.

9. The apparatus according to claim 6, wherein the for each piece of news in the target news cluster, determining for the piece of news a score of being suitable for generating a commentary comprises:

extracting a feature value of the piece of news under at least one feature; and determining, based on the extracted at least one feature value, a score of being suitable for generating a commentary for the piece of news.

10. The apparatus according to claim 6, wherein the determining, for each piece of news in the target news cluster, a score of being suitable for generating a commentary for the piece of news comprises:

inputting the text comprised in the piece of news into a pre-trained score calculation model to obtain a score of being suitable for generating a commentary for the piece of news, wherein the score calculation model is used to characterize a corresponding relationship between a text and a score of being suitable for generating a commentary for the text.

11. A non-transitory computer-readable storage medium, storing a computer program thereon, wherein the computer program, when executed by one or more processors, causes the processors to perform operations, the operations comprise: acquiring at least one news cluster composed of pieces of news generated within a first preset time length, the pieces of news in the news cluster direct to a given news event;

determining a target news cluster based on the at least one news cluster;

for each piece of news in the target news cluster, determining for the piece of news a score of being suitable for generating a commentary; and generating, based on a piece of target news, a commentary for the target news cluster, wherein the piece of target news is a piece of news having a highest score of being suitable for generating a commentary in the target news cluster;

wherein the operations further comprise: generating a speech and/or a video corresponding to the commentary; and sending the speech and/or video corresponding to the commentary to a terminal device, so that the terminal device presents the received speech and/or video;

wherein the determining a target news cluster based on the at least one news cluster comprises:

determining each high-quality news cluster in the at least one news cluster as the target news cluster, wherein each high-quality news cluster comprises pieces of news direct to the given news event, the pieces of news comprising images and videos, the images being not image frames in the videos, wherein a number of the images comprised in the pieces of news of the high-quality news cluster is greater than a preset minimum number of images, and a number of the videos comprised in the news of the high-quality news cluster is greater than a preset minimum number of videos.

12. The non-transitory computer-readable storage medium according to claim 11, wherein the generating, based on a piece of target news, a commentary of the target news cluster comprises:

determining the text comprised in the target news as a target text;

deleting a text unsuitable for a commentary from the target text, wherein the text unsuitable for a commentary is a text in a predetermined set of texts unsuitable for a commentary;

replacing the written language included in the target text after deleting the text unsuitable for a commentary with a spoken language of an identical semantics; and determining a digest text obtained by extracting a digest from the target text including the replaced spoken language as the commentary of the target news cluster.

13. The non-transitory computer-readable storage medium according to claim 12, wherein the determining a digest text obtained by extracting a digest from the target text including the replaced spoken language as the commentary of the target news cluster comprises:

determining a maximum number of characters for the commentary according to a preset highest speech rate and a preset longest audio duration;

extracting a digest from the target text, the extracted digest text having fewer characters than the maximum number of characters of the commentary; and determining the extracted digest text as the commentary of the target news cluster.

14. The non-transitory computer-readable storage medium according to claim 11, wherein the for each piece of news in the target news cluster, determining for the piece of news a score of being suitable for generating a commentary comprises:

extracting a feature value of the piece of news under at least one feature; and determining, based on the extracted at least one feature value, a score of being suitable for generating a commentary for the piece of news.

15. The non-transitory computer-readable storage medium according to claim 11, wherein the determining, for each piece of news in the target news cluster, a score of being suitable for generating a commentary for the piece of news comprises:

inputting the text comprised in the piece of news into a pre-trained score calculation model to obtain a score of being suitable for generating a commentary for the piece of news, wherein the score calculation model is used to characterize a corresponding relationship between a text and a score of being suitable for generating a commentary for the text.

* * * * *